(No Model.)
H. N. RUTTAN.
VENTILATION OF SEWERS OR DRAIN PIPES.
No. 576,230. Patented Feb. 2, 1897.
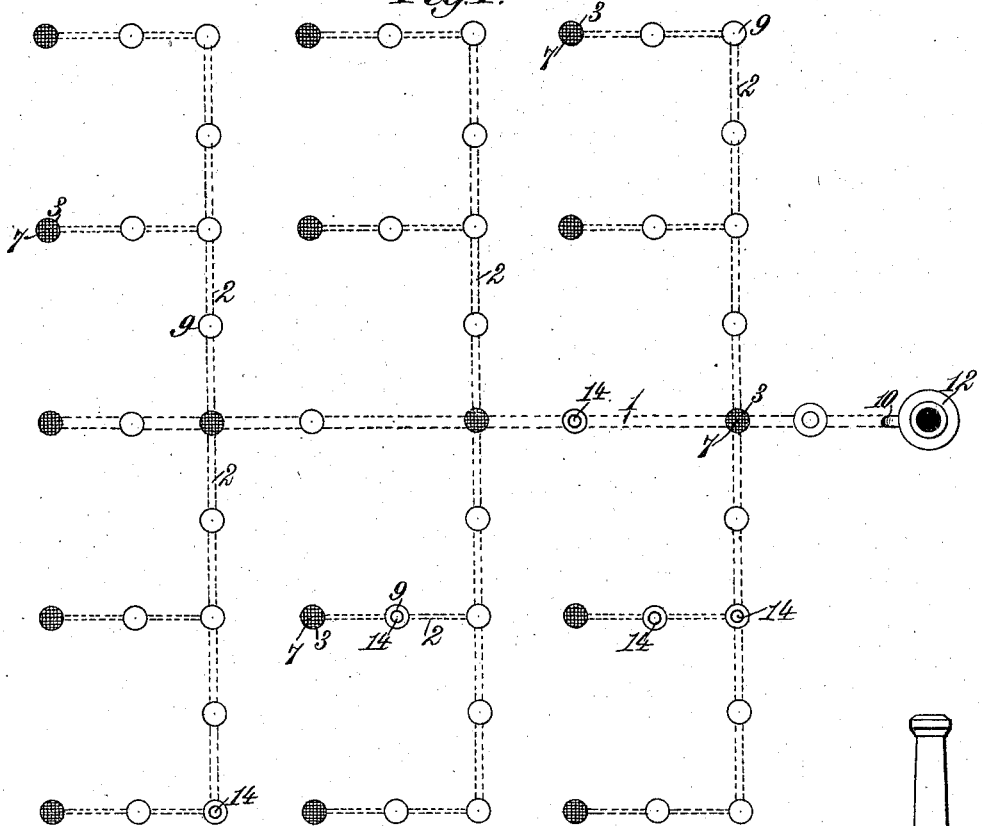
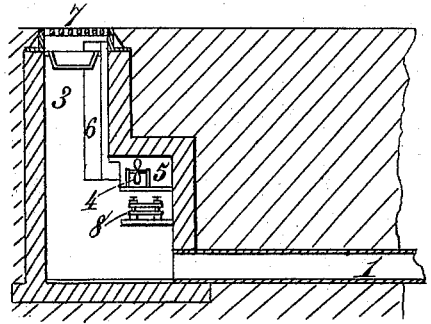
Witnesses.
Robert Everett.
Dennis Sumby.
Inventor:
Henry N. Ruttan.
By James L. Norris.
Atty.

UNITED STATES PATENT OFFICE.

HENRY NORLANDE RUTTAN, OF WINNIPEG, CANADA.

VENTILATION OF SEWERS OR DRAIN-PIPES.

SPECIFICATION forming part of Letters Patent No. 576,230, dated February 2, 1897.

Application filed October 29, 1895. Serial No. 567,262. (No model.)

*To all whom it may concern:*

Be it known that I, HENRY NORLANDE RUTTAN, of Winnipeg, county of Selkirk, Province of Manitoba, Dominion of Canada, have invented new and useful Improvements in the Ventilation of Sewers or Drain-Pipes, of which the following is a specification.

My invention relates to the ventilation of sewers and drain-pipes, my purpose being to provide a new and useful improvement upon the present methods and mechanisms for ventilating subways, such as sewers, drains, and conduits, whereby I secure complete and perfect ventilation in every part of the subway, avoid the escape of foul air into the streets by way of the manholes, and supply a controllable quantity of fresh pure air, under controllable pressure, at points separately located along the line of the sewer or other subway, and simultaneously exhaust from other points and with a controllable force, thereby causing constant currents of fresh air to traverse the sewer or subway with any desired velocity.

The invention consists in the novel mode of procedure and in the mechanism for practicing said method, which are hereinafter fully described, and then particularly pointed out and defined in the claims which conclude this specification.

To enable others to clearly understand and to practice my said invention, I will proceed to describe the same in detail, reference being had to the accompanying drawings, showing one form of apparatus suitable for the purpose, in which—

Figure 1 is a diagram illustrating an arrangement of sewer or subway with manholes or openings, air-outlet, and air forcing and exhausting mechanism. Fig. 2 is a transverse section of a sewer or subway, showing its connection with a manhole, air forcing and heating mechanism for driving continuous currents of heated air through said sewer, and an outlet or vent so constructed as to be used at points where the escape of air from the sewer-outlets would cause annoyance to those dwelling in the vicinity. Fig. 3 is a detailed view of one of the safety or air valves.

The reference-numeral 1 in said drawings indicates a portion of a main sewer, drain-pipe, or other subway of any ordinary construction, and the numeral 2 denotes a plurality of contributory sewers or subways, which communicate with said main sewer at intervals.

At stated intervals along each of the contributory sewers or subways 2 are manholes or similar openings 3, in each of which is placed an air-forcing mechanism, such as a blower 4, driven by electricity or by any other suitable power. I prefer to place each of these air-forcing mechanisms in a chamber 5, which communicates with an air-passage 6, the open upper end of said passage lying beneath the grate or cover 7, placed over the mouth of the manhole at the street-level.

Beneath the chamber 5 and in the path which the forced blast of air follows in order to enter the main sewer 1 I may place any suitable form of heater 8, having such construction that the air driven over or through said heater may acquire an increased temperature before entering the sewer or subway. It should be noted, however, that these heaters are not indispensable features in my invention, as I may and often do omit them and use the air at normal temperature. In cities situated upon latitudes where low temperatures prevail during part of the year and where there may be danger of the sewers freezing, the heating of air which is forced through said sewers may be necessary in order to keep them open and enable the sewage to pass off instead of accumulating and choking the exit-channels.

At suitable points in both the main sewer and contributory sewers are placed manholes 9 of ordinary construction. In using my described system of ventilation these manholes should be provided with tight covers, in order that the forced blasts of air may not escape.

At the outlet 10 of the main sewer 1 is the air-exit, which may consist of a chimney 12 or other means for discharging the air-current at such a point that dwellers in the vicinity shall not be annoyed by disagreeable odors. At a suitable point in relation to this outlet I provide an exhaust mechanism 13, which may consist of a fan-blower or any other suitable means, as my invention does not depend upon specific air-forcing or air-exhausting apparatus. I propose to employ for these purposes any means which may be best adapted to the purpose and to actuate them by any motive power preferred.

Heretofore a change of air in sewers has been attempted by what is termed the "exhaust" or "vacuum" system, in which chimney-stacks of large size and considerable height have been necessary, and even with the most improved means of operating this system a complete and uniform ventilation throughout has been found to be practically impossible. Those methods also which depend upon natural draft by locating the outlet or outlets at the highest point or points and the air-inlets at the lowest have been demonstrated to be practically inoperative except in the immediate vicinity of the uptake or exhausting stack.

My method, on the contrary, consists in applying to a system of sewers or underground conduits the forcing or "plenum" system of ventilation, in which I supply air by direct mechanical means, reinforced at suitable intervals by similar means and at the exit by an exhaust. I thus obtain complete uniform ventilation through each and every part of the main and contributory sewers. I maintain also a pressure of air in the sewers sufficient to give the proper velocity to the current to insure thorough ventilation. This pressure, however, is not such as to force the traps or cause escape of air save at the designated air-outlets. Where it is desirable to regulate the pressure, I may place safety valves or traps 14 in the sewers wherever necessary.

I have shown one form of safety-valve in detail in Fig. 3 of the drawings, but I do not wish to be understood as confining myself to this particular type of valve. In the form shown the valve 14 is seated in the manhole-cover 9' and opens upward against the tension of a spring 15, wound spirally around the valve-spindle 16. One end of said spring is secured to the lower end of the valve-spindle, while its upper portion bears against the under side of the manhole-cover. In this manner the pressure will always be under perfect control, although it will never be as great under my system as it frequently is from wind-pressure alone. These safety-valves may be of any known kind set to open at a given pressure, so that the interior pressure upon the sewers or pipes shall never be excessive. Any familiar form of these valves may be used.

All catch-basins and other entrances to sewers or conduits are suitably trapped to prevent the escape of air at any outlet save the one chosen, unless the pressure of air within the sewer or conduit rises above a predetermined point. Should this happen, the traps serve as safety-valves and prevent the pressure of air rising above the proper point.

I may mention that by my invention danger of explosion of gas accumulating in sewers and conduits, which has been a frequent cause of great damage and even loss of life, is entirely obviated.

I employ positive exhausting apparatus at the outlets in contradistinction to the method heretofore used of employing forcing devices in the pipes, but depending upon the greater elevation of the outlet to enable it to discharge the accumulated volumes of air driven toward it by the forcing devices. Such a system is wholly unreliable. Changes in temperature or in the force and direction of the prevailing wind, as well as other causes, may at any time wholly arrest the discharge or so far obstruct it as to cause the vitiated air to back up through one or more of the passages where the forcing apparatus is weakest, whence it may pass into dwellings or into the open streets.

What I claim is—

1. The method of sewer or subway ventilation herein described, which consists in positively forcing air from the exterior into the main sewer, or subway, and into each contributory sewer, separately, reinforcing the air-pressure within said main and contributory sewers by positively forcing air into each by positive means at a plurality of different points separated by suitable intervals one from another, and maintaining a substantial uniformity of air-pressure throughout the system, substantially as described.

2. The described method of ventilating sewers or subways which consists in positively forcing air from the exterior directly into the main and contributory sewers, reinforcing the air-pressure within said main and contributory sewers by positively forcing air into each at a plurality of different points separated from each other by suitable intervals heating the air between the surface of the street and the points where it enters the sewers, and positively exhausting the air from said main and contributory sewers at the points of exit, substantially as described.

3. The process of sewer ventilation hereinbefore described, which consists in positively forcing and exhausting the interior air at the entrances and exits of the sewers, supplementing the air-forcing action at a plurality of suitable points between the entrances and exits, relieving excessive pressure at points where it occurs, and heating the entering air-currents, substantially as described.

4. In a ventilating system for sewers, the combination with fan-blowers placed at the entrances to both main and contributory sewers, of positive means for operating said fan-blowers to force air into the sewers at the points named, similar fan-blowers arranged at suitable points between the entrance and exit end and driven by positive means to force the interior air toward the exit end, or ends, fan-blowers arranged at the exit, or exits, from said sewers, positive mechanism to operate said fans to exhaust the air from the sewers, air-heaters arranged between the fan-blowers and the entrance ends of the sewers to heat the blast, and suitable air-valves arranged at suitable points intermediate of the said fan-blowers to equalize the air-pressure, substantially as described.

In testimony whereof I have hereunto set my hand in presence of two subscribing witnesses.

HENRY NORLANDE RUTTAN.

Witnesses:
H. H. SAUNDERSON,
D. W. McKERDNER.